United States Patent [19]

Boschman

[11] Patent Number: 4,752,198

[45] Date of Patent: Jun. 21, 1988

[54] APPARATUS FOR SIMULTANEOUSLY ENCAPSULATING A PLURALITY OF ELECTRONIC COMPONENTS

[75] Inventor: Everhardus H. Boschman, Aerdt, Netherlands

[73] Assignee: Arbo Handels- en Ontwikkelingsmij B.V., Ad Zevenaar, Netherlands

[21] Appl. No.: 863,024

[22] Filed: May 14, 1986

[30] Foreign Application Priority Data

May 14, 1985 [NL] Netherlands ............... 8501393

[51] Int. Cl.⁴ .................. B29C 45/02; B29C 45/14
[52] U.S. Cl. ............................ 425/116; 425/117; 425/129.1; 425/129 R; 425/145; 425/150; 425/548; 425/588
[58] Field of Search ............... 425/116, 117, 120, 121, 425/126 R, 127, 129 R, 143, 145, 144, 149, 150, 547, 543, 544, 378 R, 588, 548; 264/328.8, 328.14; 222/386.5, 386, 387; 92/5 R

[56] References Cited

U.S. PATENT DOCUMENTS

| | | | |
|---|---|---|---|
| 2,333,056 | 10/1943 | Thoreson et al. | 425/145 |
| 2,500,546 | 3/1950 | Judisch | 249/97 |
| 2,779,059 | 1/1957 | Kruft | 425/127 |
| 3,095,785 | 7/1963 | Cahill | 92/5 R |
| 3,380,117 | 4/1968 | Gluck | 425/143 |
| 3,458,931 | 8/1969 | Carlson et al. | 29/884 |
| 3,571,856 | 3/1971 | Voelker | 425/145 |
| 4,161,386 | 7/1979 | Osuna-Diaz | 425/547 |
| 4,316,145 | 2/1982 | Tann | 92/5 R |
| 4,347,211 | 8/1982 | Bandoh | 264/297 |
| 4,471,304 | 9/1984 | Wolf | 92/5 R |
| 4,563,149 | 1/1986 | Landis | 425/547 |
| 4,599,062 | 7/1986 | Konishi | 425/116 |
| 4,615,849 | 10/1986 | Hahn | 425/144 |

FOREIGN PATENT DOCUMENTS

| | | |
|---|---|---|
| 0070320 | 1/1983 | European Pat. Off. . |
| 0101630 | 2/1984 | European Pat. Off. . |
| 3032814 | 4/1982 | Fed. Rep. of Germany . |
| 51-56868 | 5/1976 | Japan ............... 425/145 |
| 0125616 | 7/1985 | Japan ............... 425/129 R |
| 1164301 | 9/1960 | United Kingdom . |

OTHER PUBLICATIONS

Patent Abstracts of Japan, vol. 9, No. 159 (Jul. 4, 1985).

Primary Examiner—Willard E. Hoag
Attorney, Agent, or Firm—Wegner & Bretschneider

[57] ABSTRACT

An apparatus is disclosed for encapsulating a plurality of electronic components, which are bonded to the conductors of a strip, within a mold. The apparatus has an injection unit made up of a plurality of plungers slidable in a carrier and controlled by hydraulic cylinders. The hydraulic cylinders apply pressure to the plungers, which have a heating element for heating the material to be injected. A sensor attached to each plunger senses when the material is sufficiently softened, at which point a driving mechanism drives the entire carrier toward the mold, causing the plungers to inject the material into the mold.

6 Claims, 3 Drawing Sheets

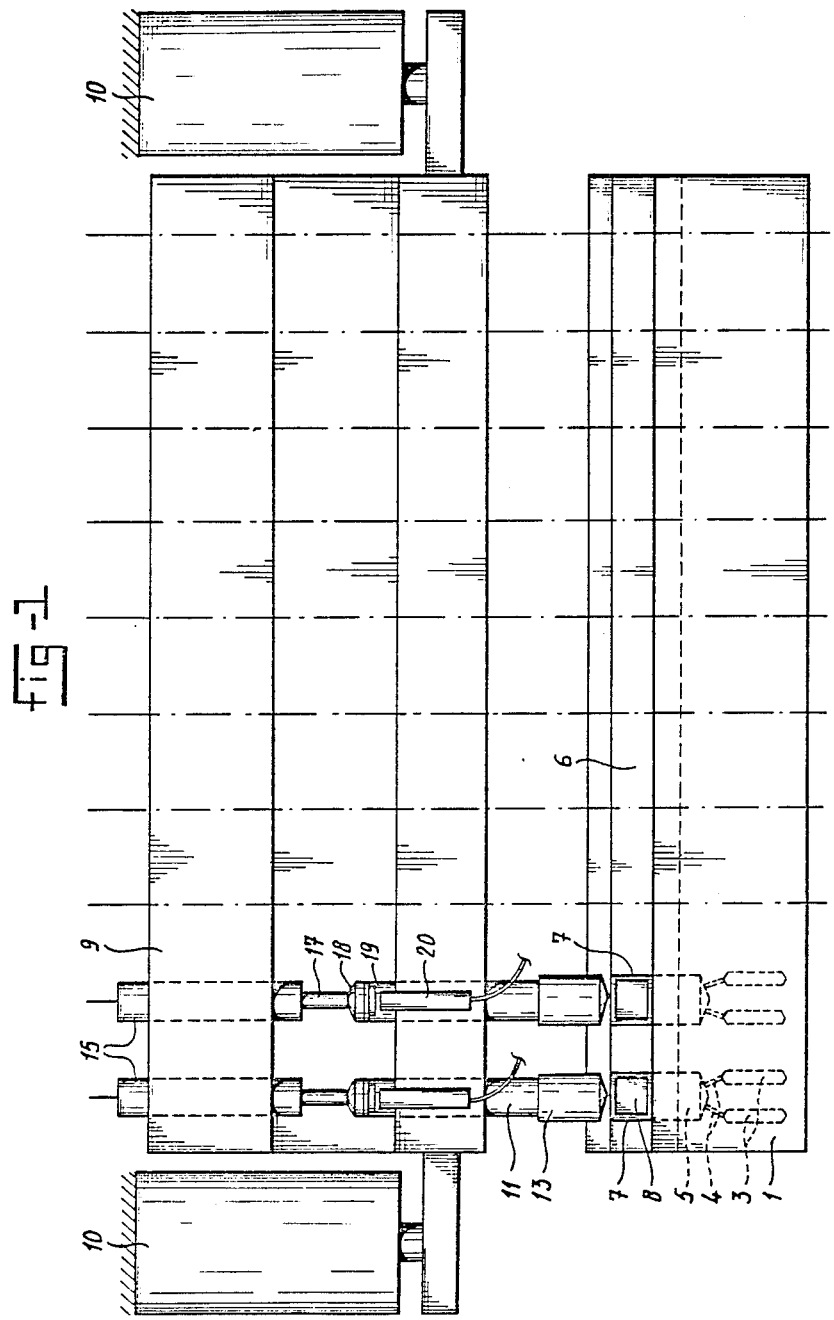

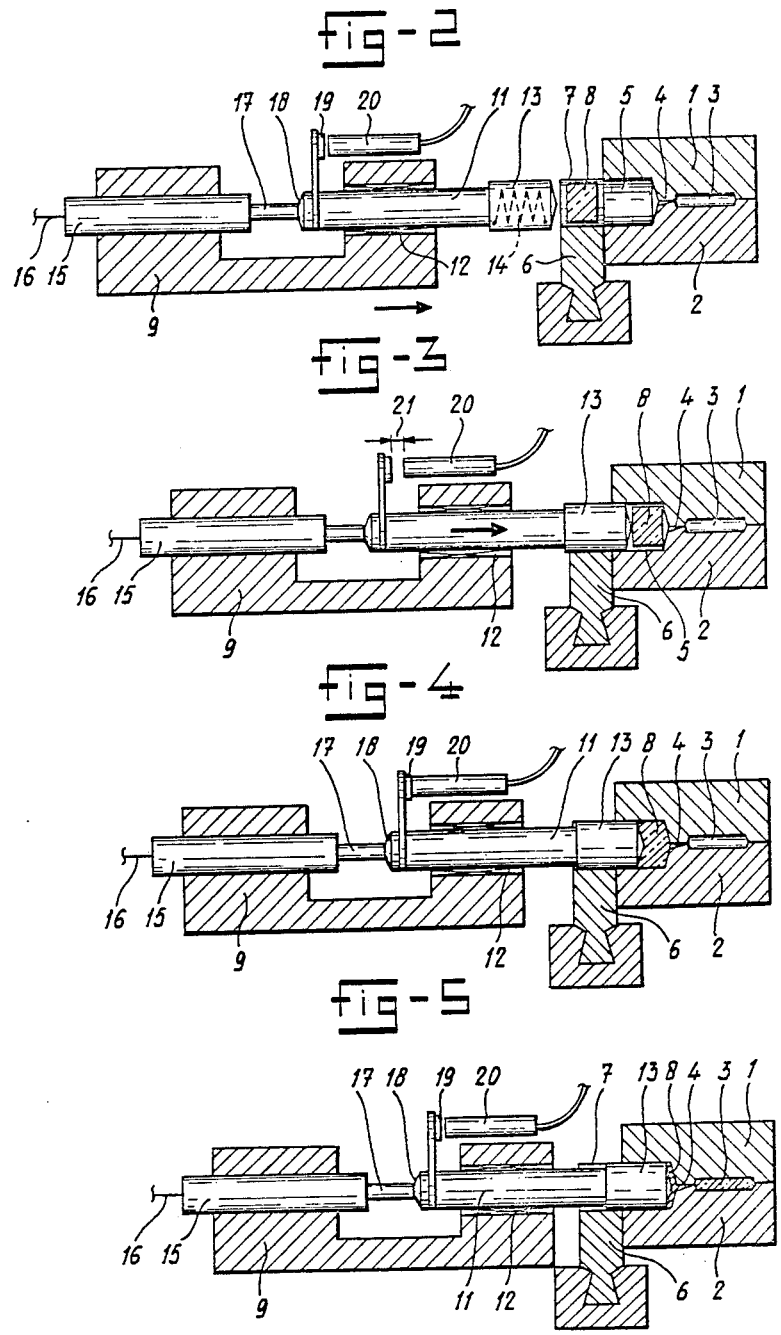

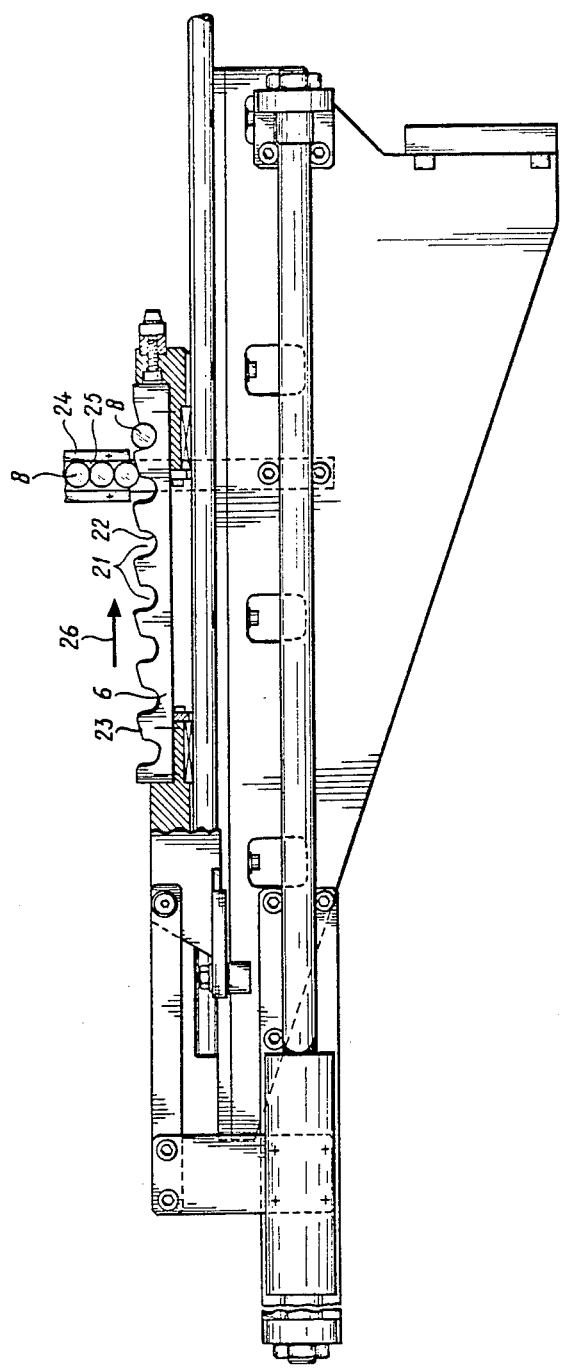

APPARATUS FOR SIMULTANEOUSLY ENCAPSULATING A PLURALITY OF ELECTRONIC COMPONENTS

The invention relates to an apparatus for simultaneously encapsulating a plurality of electronic components which are fastened by their connection points to the conductors of a strip which is subsequently to be divided into separate parts, said apparatus consisting of a heatable mould comprising a top half and a bottom half and being adapted to receive at least one strip containing one or more electronic components, and further consisting of an injection unit which is placed along the long side of the mould and has a plurality of hydraulically controllable plungers adapted to be moved towards and away from the mould cavity sprues leading into the side wall of the mould, a number of chambers for receiving pellets of the plastics material used for the encapsulation, the number of chambers being equal to the number of plungers and said chambers being situated between the plungers in their retracted position and plunger cavities, corresponding to the diameter of the plungers, in the mould.

An apparatus of this kind is described in Dutch Patent Application No. 8205253. According to this patent application the encapsulation of the electronic components placed in a mould is first effected with the aid of injection means connected to the side edge of the mould and consisting of hydraulic cylinders which operate separately for each mould cavity and which when operated press a pellet or pill of plastics material, preheated in any manner, into the mould cavity. It is thus already known herefrom to use a separate plunger for each pellet, which is of great importance because the advantage over the prior art is now achieved that the pellets do not need to have accurate dimensions. The differences in dimensions of pellets are now compensated by the sprue, which because of its lateral action is per se of small dimensions.

Electronic components, particularly integrated circuits, are generally soldered to the conductors of the strip with the aid of particularly thin gold wires.

The encapsulation with plastics material must be effected in such a manner that the connections are not broken, that is to say the gold wires must not be broken or detached from the soldered joint by the liquid plastics material flowing at high speed. A hydraulic pressure cylinder presses the liquefied plastics material under pressure, and consequently at varying speed, into the mould cavity, which may give rise to the breaking of connections.

The invention seeks to provide an apparatus with which this shortcoming does not occur.

According to the invention this aim is achieved in that each plunger is mounted for sliding in a carrier frame which in turn is adapted to be moved away from and towards the mould by means of a mechanism which is adapted to move the carrier frame at a controlled speed; that each plunger is connected to a pressure means adapted to exert a constant pressure on the plunger; that each plunger has a heating element, and that each plunger carries a signal means and that all the signal means of all the plungers are connected to the operating circuit of the driving mechanism, in such a manner that on the softening of the pellets subjected to pressure and heated by the plungers the driving mechanism moves the frame towards the mould as soon as all the signal means have operated.

It is thereby ensured that all the plungers associated with the various pellets can be placed under a relatively light pressure with the aid of the plungers heated by the heating element. As soon as a pellet is now softened the respective plunger will move slightly through the action of the pressure applied to it, and thereby close a signal means, such as an electronic contact. When all the signal means have given the signal, thereby indicating that all the pellets have reached the desired temperature, that is to say have been softened, the carrier frame of the plungers moves towards the mould at a predetermined and naturally controllable speed, for example a constant speed, so that all the mould cavities can likewise be filled at a controllable speed of flow.

The driving mechanism used may be a hydraulic driving mechanism, such as hydraulic cylinders, because when a controlled volume flow is provided the movement of the piston in the cylinder is possible at for example a controlled (optionally constant) speed. The plungers may each be coupled to a hydraulic operating cylinder. These cylinders are connected to a hydraulic circuit whose pressure can be brought to two preadjustable levels by means of hydraulic pressure controllers, this circuit including if necessary an accumulator and containing a gaseous medium under pressure. These controllers then supply the force for applying the heated plungers against the pellets and thus ensure the application of pressure.

The invention will now be explained more fully with the aid of the drawings.

FIG. 1 shows diagrammatically in top plan view an apparatus according to the invention.

FIGS. 2 to 5 show diagrammatically in crosssection the operating principle of the apparatus according to the invention.

FIG. 6 is a side view of the mechanism for placing the pellets in front of the plungers.

The drawings show a mould comprising a top half 1 and a bottom half 2, between which are formed a row of mould cavities 3 with sprues 4 and a plunger cavity 5.

Next to the mould is disposed a strip 6 having chambers 7 for holding pellets 8.

At 9 is situated a horizontally movable carrier frame which is coupled to two hydraulic cylinders 10. This carrier frame carries a number of plungers 11, which at 12 are guided for sliding in the frame and which are provided with a head 13 whose diameter is such that this head will fit accurately into the plunger cavity 5 of the mould. Each head is provided with a heating element 14.

In the frame 9 are fastened hydraulic cylinders 15 which are connected to a circuit 16 under constant pressure, the piston rods 17 of said cylinders lying at 18 against the plungers 11.

Each plunger carries a contact 19 cooperating with a counter-contact 20.

Instead of the signal device consisting of these contacts, other signal means are also conceivable.

FIG. 2 shows the starting position in which the mould 1, 2 is closed and a pellet 8 is disposed in front of each opening 5.

The carrier frame 9 is now moved with the aid of the cylinders 10 from the position shown in FIG. 2 to the position shown in FIG. 3, in which the heads 13 of the plungers 11 have entered the plunger cavities 5 and have thus pushed the pellets 8 in front of them and pressed them into the plunger cavity; as a consequence of this movement the plungers have been slightly pressed back, that is to say the hydraulic circuit 15, 16 has been slightly tensioned so that the distance indicated at 21 in FIG. 3 is formed between the contacts 19 and 20.

After adequate heating of the switched-on heating element 14 in each head 13 the respective plunger will slide further into the plunger cavity 5, because the pellet will have been softened by the heat. This condition is shown in FIG. 4, and has the consequence that the contacts 19, 20 are closed.

When all the contacts have now been closed, which will occur more or less simultaneously, the hydraulic cylinders 15 are brought to a higher controlled pressure, so that the carrier frame 9 slides further in the direction of the mould, while the heads 13 of the plungers now penetrate as far as possible into the plunger cavities 5 and press the plastics material into the mould.

Since each plunger is subjected to pressure beforehand and gives the signal only when the pellets are sufficiently heated, differences in the volumes of the pellets are no longer of importance.

Since the carrier frame moves all the plungers simultaneously at a predetermined controllable speed, the filling is effected in the required careful manner. The stroke of the cylinders 10 can be accurately limited, because before the carrier frame is moved for the purpose of filling the mould cavities, each plunger has already been brought into a position which takes into account any slightly different dimensions of the pellets in relation to one another.

In view of the ready flowability of the plastics material once it has been melted, it may in this connection be sufficient to do nothing in respect of the pressure of the hydraulic circuit 15, 16 acting on the plungers. If however it is desired to achieve a fixed location for the position assumed by the plungers before they press the plastics material into the mould cavity, this can be done by increasing the level of the pressure at the moment when all the signal devices give the desired signal to the cylinders 10.

Instead of the cylinders 10, any other mechanism which can ensure a controlled speed may be used, for example a threaded spindle mechanism driven by an electric motor.

The side view shown in FIG. 6 of the strip 6, which is shown in top plan view in FIG. 1, with the chambers 7 for the pellets 8, enables it to be seen that the chambers are formed by recesses 21 which are open at the top and have a cylindrical bottom 22. The width of this strip, which resembles a toothed rack, corresponds to the horizontal thickness, shown in this Figure, of the pellets 8 viewed in the direction of the transverse axis of the recess 7. Between the recesses 21 this strip has inclined surfaces 23. At 24 is shown a magazine provided with a discharge passage 25 containing cylindrical pellets 8 one above the other.

The strip 6 is movable from the position shown to the right in FIG. 6, as indicated by the arrow 26. The recesses 21 are then filled one by one with pellets.

On further movement in the direction of the arrow 26 the strip then reaches the position shown in FIG. 1. The magazine is then locked.

After the injection of the plastics material into the mould cavities, the strip moves back towards the magazine for refilling.

I claim:

1. An apparatus for simultaneously encapsulating a plurality of electronic components which are fastened by their connection points to the conductors of a strip which is subsequently to be divided into separate parts, said apparatus comprising:
   a heatable mold comprising a top half and a bottom half which when placed together form a mold cavity, a plurality of cavity sprues, and a plurality of plunger cavities, the mold being adapted to receive at least one strip containing one or more electronic components;
   an injection unit placed along the long side of the mold, comprising:
   a carrier frame which is movable toward and away from the mold at a controlled speed by a driving mechanism;
   a plurality of hydraulically controllable plungers mounted on the carrier frame and adapted to move in and out of the plunger cavities toward and away from the cavity sprues, each of said plungers having a heating element;
   a plurality of chambers interposed between the mold and the plungers when they are in their retracted position, said chambers being adapted to receive pellets of material used for encapsulating the electronic components, the number of chambers being equal to the number of plungers;
   pressure means for exerting a constant pressure on the plungers; and
   a plurality of sensing means for sensing when each pellet is sufficiently softened to be injected, each sensing means sending a signal to an operating circuit;
   said driving mechanism being actuatable only when a circuit for operating the driving mechanism is closed by all of the sensing means, indicating that all of the pellets are sufficiently softened for injection.

2. An apparatus as claimed in claim 1, wherein the driving mechanism is a hydraulic driving mechanism.

3. An apparatus as claimed in claim 1, wherein the pressure means is the hydraulic operating cylinder of each of the plungers connected to a constant-pressure hydraulic circuit.

4. An apparatus as claimed in claims 1, 2 or 3, wherein said chambers are formed by recesses, open at the top, in a strip, said strip being reciprocatingly movable in a direction perpendicular to the direction of movement of the plungers, said injection unit further comprising a magazine which delivers pellets in the vertical direction from an outlet to the recesses, said magazine depositing one pellet in each recess when that recess is situated under the outlet.

5. An apparatus as claimed in claim 4, wherein the strip is provided between the recesse with a top surface inclined downwards toward a recess which is to be filled.

6. An apparatus as claimed in claim 1, 2, or 3, wherein the sensing means each comprise a pair of contacts which are closed when the pressure means moves the plungers a predetermined distance.

* * * * *